United States Patent
Kang et al.

(10) Patent No.: US 11,887,224 B2
(45) Date of Patent: Jan. 30, 2024

(54) METHOD, APPARATUS, AND COMPUTER PROGRAM FOR COMPLETING PAINTING OF IMAGE, AND METHOD, APPARATUS, AND COMPUTER PROGRAM FOR TRAINING ARTIFICIAL NEURAL NETWORK

(71) Applicant: NAVER WEBTOON LTD., Seongnam-si (KR)

(72) Inventors: Sungmin Kang, Seongnam-si (KR); Jaehyuk Chang, Seongnam-si (KR)

(73) Assignee: NAVER WEBTOON LTD., Seongnam-si (KR)

( * ) Notice: Subject to any disclaimer, the term of this patent is extended or adjusted under 35 U.S.C. 154(b) by 386 days.

(21) Appl. No.: 17/242,831

(22) Filed: Apr. 28, 2021

(65) Prior Publication Data

US 2021/0248795 A1   Aug. 12, 2021

Related U.S. Application Data

(63) Continuation of application No. PCT/KR2019/010556, filed on Aug. 20, 2019.

(30) Foreign Application Priority Data

Nov. 2, 2018 (KR) .................. 10-2018-0133842

(51) Int. Cl.
*G06T 5/00* (2006.01)
*G06N 3/08* (2023.01)
(Continued)

(52) U.S. Cl.
CPC ............ *G06T 11/40* (2013.01); *G06F 16/532* (2019.01); *G06F 16/5838* (2019.01); *G06N 3/04* (2013.01);
(Continued)

(58) Field of Classification Search
None
See application file for complete search history.

(56) References Cited

U.S. PATENT DOCUMENTS

| 2013/0055116 A1* | 2/2013 | Kern ..................... G06F 16/958 715/762 |
| 2014/0354676 A1 | 12/2014 | Blanc |

(Continued)

FOREIGN PATENT DOCUMENTS

| JP | 2015511339 A | 4/2015 |
| KR | 1020150034058 A | 4/2015 |

OTHER PUBLICATIONS

Notice of allowance issued in Korean application No. 10-2018-0133842, dated Jul. 28, 2020.

(Continued)

*Primary Examiner* — Joni Hsu
(74) *Attorney, Agent, or Firm* — Greer Burns & Crain Ltd.

(57) ABSTRACT

A method of completing coloring of an image based on a query regarding a color-unknown region in the image and an answer to the query, includes: generating, by using an artificial neural network, a first intermediate image in which at least one uncolored region in a primary image is colored; generating, by using the artificial neural network, a first color query regarding the at least one color-unknown region in the primary image; and generating a secondary image based on at least one of the first color query, a first answer to the first color query, and the first intermediate image.

11 Claims, 13 Drawing Sheets

(51) Int. Cl.
  *G06T 11/00* (2006.01)
  *G06T 11/40* (2006.01)
  *G06F 16/583* (2019.01)
  *G06F 16/532* (2019.01)
  *G06N 3/04* (2023.01)

(52) U.S. Cl.
  CPC ............... *G06N 3/08* (2013.01); *G06T 5/001* (2013.01); *G06T 11/001* (2013.01); *G06T 2200/24* (2013.01); *G06T 2207/20084* (2013.01)

(56) References Cited

U.S. PATENT DOCUMENTS

2015/0220805 A1* 8/2015 Chen ................. G06T 7/194
  382/199
2018/0089532 A1 3/2018 Xu
2018/0150947 A1* 5/2018 Lu ............................ G06T 5/20

OTHER PUBLICATIONS

Office action issued in Korean application No. 10-2018-0133842, dated Jan. 21, 2020.

Yuanzheng C.; User-Guided Deep Anime Line Art Colorization with Conditional Adversarial Networks; Aug. 10, 2018; pp. 1-10; https://arxiv.org/abs/1808.03240.

Yi Xiao; Interactive Deep Colorization with Simultaneous Global and Local Inputs; Jan. 27, 2018; pp. 1-14 https://arxiv.org/abs/1801.09083.

Chie Furusawa; Comicolorization: Semi-Automatic Manga Colorization; Sep. 28, 2017; pp. 1-10; https://arxiv.org/abs/1706.06759.

Hong et al.; Webtoon Colorization Method using GAN and Edge Detector; Korea Information Science Society; Jan. 21, 2020; pp. 2166-2168; http://www.dbpia.co.kr/journal/articleDetail?nodeId=NODE07503646.

ISR issued in Int'l. application No. PCT/KR2019/010556, dated Dec. 17, 2019.

General Incorporated Foundation Institute of Image Information and Television Engineers, May 1, 2018, vol. [72nd ] No. 3, and pp. 47-51.

AI automatically turns line drawings into color illustrations! Explain how to use the automatic line drawing coloring tool (JPaintsChainer) https://ferret-plus.com/7786; Jan. 2018; pp. 1-12.

Final rejection issued in JP Patent Application No. 2021-523890, dated Jan. 10, 2023.

* cited by examiner

321

METHOD, APPARATUS, AND COMPUTER PROGRAM FOR COMPLETING PAINTING OF IMAGE, AND METHOD, APPARATUS, AND COMPUTER PROGRAM FOR TRAINING ARTIFICIAL NEURAL NETWORK

CROSS-REFERENCE TO RELATED APPLICATION

This is a continuation application of International Application No. PCT/KR2019/010556, filed Aug. 20, 2019, which claims the benefit of Korean Patent Application No. 10-2018-0133842, filed Nov. 2, 2018.

BACKGROUND OF THE INVENTION

Field of Invention

The present disclosure relates to a method, apparatus, and computer program for completing coloring of an image based on a query regarding a color-unknown region in the image and an answer to the query, and a method, apparatus, and computer program for training an artificial neural network that colors at least some region of a color-unknown region in an image and generates a query regarding a color of remaining regions excluding the at least some region.

Description of Related Art

With the supply of various smart devices including computers, services using online networks, in particular, services providing content via online, are being provided nowadays.

A webtoon service providing cartoon content online is a representative example of such services.

According to general technology, a producer prepares all scenes individually to produce the cartoon content. However, today's content production speed according to such an approach is unable to keep up with an expansion speed of an online content market and a consequent increasing speed of the number of users, and thus acts as an element interfering with smooth supply of content.

Accordingly, there is a need for a more efficient method of producing webtoon content.

BRIEF SUMMARY OF THE INVENTION

The present disclosure enables online content to be more efficiently produced. In particular, the present disclosure enables a user to produce content more quickly by reducing a time used for coloring, with respect to producing content that requires coloring by the user, such as a webtoon.

Also, the present disclosure is to reduce a working time according to modification by a user via more accurate coloring, with respect to automatic coloring of an image not performed by the user.

In addition, the present disclosure is to complement a weakness of automatic coloring by querying a user about a color of a region where a color is unclear, with respect to automatic coloring of an image not performed by the user.

According to an embodiment of the present disclosure, a method of completing coloring of an image based on a query regarding a color-unknown region in the image and an answer to the query, includes: generating, by using an artificial neural network, a first intermediate image in which at least one uncolored region in a primary image is colored; generating, by using the artificial neural network, a first color query regarding the at least one color-unknown region in the primary image; and generating a secondary image based on at least one of the first color query, a first answer to the first color query, and the first intermediate image.

The method may further include, after the generating of the secondary image: generating, by using the artificial neural network, a second intermediate image in which at least one uncolored region in the secondary image is colored; generating, by using the artificial neural network, a second color query regarding the at least one color-unknown region in the secondary image; and generating a tertiary image based on at least one of the primary image, the second color query, a second answer to the second color query, and the second intermediate image.

The first answer may be determined based on a user input corresponding to the first color query, and the second answer may be determined based on a user input corresponding to the second color query.

The artificial neural network may generate an unknown degree for each of the at least one color-unknown region in the secondary image, and the generating of the second color query may include generating, as the second color query, a query about a color of an unknown region in which the unknown degree satisfies a certain condition, from among the at least one color-unknown region in the secondary image.

The method may further include generating a completed image in which all regions are colored by identically generating the secondary image at a second time point and the tertiary image at a first time point before the second time point and repeatedly performing the generating of the second intermediate image, the generating of the second color query, and the generating of the tertiary image.

The artificial neural network may be a neural network that learned a corresponding relationship between an input image in which a first region is not colored and an output image in which the first region is colored.

The artificial neural network may be a neural network that further learned a corresponding relationship between the input image, a third color query regarding a colored second region of the input image, a third answer to the third color query, the output image, and a fourth color query regarding the output image. Here, the second region may be a region colored according to the third color query of the input image and the third answer.

According to an embodiment of the present disclosure, a method of training an artificial neural network that colors at least a partial region of a color-unknown region in an image and generates a query regarding a color of a remaining region excluding the at least the partial region of the color-unknown region, includes: training the artificial neural network by using an input image in which a first region is not colored and an output image in which the first region of the input image is colored in a first color, such that a corresponding relationship between the first region and the first color is reflected; and training the artificial neural network such that a corresponding relationship between the input image, a third color query regarding a colored second region of the input image, a third answer to the third color query, the output image, and a fourth color query regarding the output image is further reflected.

The third answer may be determined based on an average color of the second region of the input image.

According to an embodiment of the present disclosure, an apparatus for completing coloring of an image based on a query regarding a color-unknown region in the image and an answer to the query, the apparatus including a processor configured to: generate, by using an artificial neural network, a first intermediate image in which at least one uncolored region in a primary image is colored; generate, by using the artificial neural network, a first color query regarding the at least one color-unknown region in the primary image; and generate a secondary image based on at least one of the first color query, a first answer to the first color query, and the first intermediate image.

The processor may be further configured to: generate, by using the artificial neural network, a second intermediate image in which at least one uncolored region in the secondary image is colored; generate, by using the artificial neural network, a second color query regarding the at least one color-unknown region in the secondary image; and generate a tertiary image based on at least one of the primary image, the second color query, a second answer to the second color query, and the second intermediate image.

The first answer may be determined based on a user input corresponding to the first color query, and the second answer may be determined based on a user input corresponding to the second color query.

The artificial neural network may generate an unknown degree for each of the at least one color-unknown region in the secondary image, and the processor may be further configured to generate, as the second color query, a query about a color of an unknown region in which the unknown degree satisfies a certain condition, from among the at least one color-unknown region in the secondary image.

The processor may be further configured to generate a completed image in which all regions are colored by identically generating the secondary image at a second time point and the tertiary image at a first time point before the second time point and repeatedly performing the generating of the second intermediate image, the generating of the second color query, and the generating of the tertiary image.

The artificial neural network may be a neural network that learned a corresponding relationship between an input image in which a first region is not colored and an output image in which the first region is colored.

The artificial neural network may be a neural network that further learned a corresponding relationship between the input image, a third color query regarding a colored second region of the input image, a third answer to the third color query, the output image, and a fourth color query regarding the output image. Here, the second region may be a region colored according to the third color query of the input image and the third answer.

According to an embodiment of the present disclosure, an apparatus for training an artificial neural network that colors at least a partial region of a color-unknown region in an image and generates a query regarding a color of a remaining region excluding the at least the partial region of the color-unknown region, the apparatus including a processor configured to: train the artificial neural network by using an input image in which a first region is not colored and an output image in which the first region of the input image is colored in a first color, such that a corresponding relationship between the first region and the first color is reflected; and train the artificial neural network such that a corresponding relationship between the input image, a third color query regarding a colored second region of the input image, a third answer to the third color query, the output image, and a fourth color query regarding the output image is further reflected.

The third answer may be determined based on an average color of the second region of the input image.

According to the present disclosure, online content can be more efficiently produced. In particular, with respect to producing content that requires coloring by a user, such as a webtoon, the user can produce content more quickly by reducing a time used for coloring.

Also, with respect to automatic coloring of an image not performed by a user, a working time according to modification of the user can be reduced via more accurate coloring, and a weakness of the automatic coloring can be complemented by querying the user about a color of a region where a color is unclear.

DETAILED DESCRIPTION OF THE INVENTION

Figure 1:
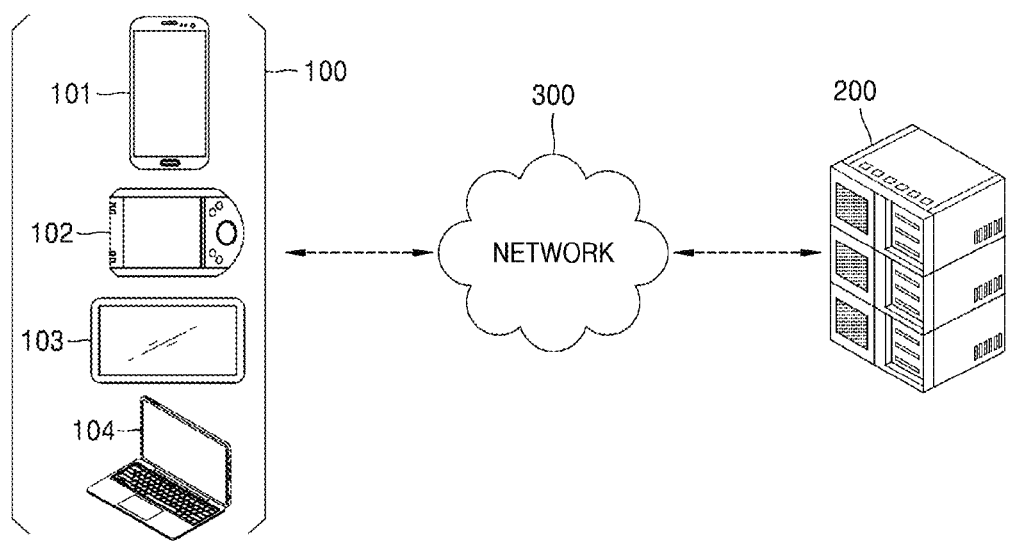
FIG. 1 is a diagram showing an example of a network environment, according to an embodiment of the present disclosure.

According to an embodiment of the present disclosure, a method of completing coloring of an image based on a query regarding a color-unknown region in the image and an answer to the query, includes: generating, by using an artificial neural network, a first intermediate image in which at least one uncolored region in a primary image is colored; generating, by using the artificial neural network, a first color query regarding the at least one color-unknown region in the primary image; and generating a secondary image based on at least one of the first color query, a first answer to the first color query, and the first intermediate image.

The detailed description of the present disclosure to be described below refers to the accompanying drawings, which illustrate specific embodiments in which the present disclosure may be practiced. These embodiments are described in sufficient detail to enable one of ordinary skill in the art to practice the present disclosure. It is to be understood that various embodiments of the present disclosure are different from each other, but need not be mutually exclusive. For example, specific shapes, structures, and characteristics described herein may be changed from one embodiment to another embodiment and implemented without departing from the spirit and scope of the present disclosure. In addition, it should be understood that positions or arrangements of individual elements in each embodiment may be changed without departing from the spirit and scope of the present disclosure. Accordingly, the detailed description described below is not implemented in a limiting sense, and the scope of the present disclosure may encompass the scope claimed by claims and all scopes equivalent thereto. In drawings, the like reference numerals denote the same or similar elements over various aspects.

Hereinafter, various embodiments of the present disclosure will be described in detail with reference to accompanying drawings to enable one of ordinary skill in the art to easily execute the present disclosure.

FIG. 1 is a diagram showing an example of a network environment, according to an embodiment of the present disclosure.

The network environment of FIG. 1 includes a plurality of user terminals 101 through 104, a server 200, and a network 300. FIG. 1 is an example for describing the present disclosure and the number of user terminals or the number of servers is not limited to that shown in FIG. 1.

The plurality of user terminals 101 through 104 may transmit, to the server 200, an image in which coloring is to be completed according to an operation of a user, and receive, from the server 200, a query related to the coloring, an image that is partially colored, and an image in which coloring is completed.

The plurality of user terminals 101 through 104 may be fixed terminals or mobile terminals implemented as computing devices. The plurality of user terminals 101 through 104 may be, for example, smart phones, mobile phones, navigation devices, computers, laptop computers, digital broadcasting terminals, personal digital assistants (PDAs), portable multimedia players (PMPs), and tablet personal computers (PCs).

The plurality of user terminals 101 through 104 may communicate with each other and/or with the server 200 via the network 300 by using a wireless or wired communication method.

The communication method of the plurality of user terminals 101 through 104 is not limited, and not only a communication method using a communication network (for example, a mobile communication network, a wired Internet, or a wireless Internet, or a broadcast network) included in the network 300, but also a short-range wireless communication method between devices may be included. For example, the network 300 may include one or more arbitrary network from among networks such as a personal area network (PAN), a local area network (LAN), a campus area network (CAN), a metropolitan area network (MAN), a wide area network (WAN), a broadband network (BBN), and the Internet.

Also, the network 300 may include one or more of network topologies including a bus network, a start network, a ring network, a mesh network, a star-bus network, and a tree or hierarchical network, but is not limited thereto.

Hereinafter, for convenience of description, the plurality of user terminals 101 through 104 may be referred to as a user terminal 100.

The server 200 may receive an image to be colored from the user terminal 100 described above, and color the image by using a learned artificial neural network. Also, the server 200 may generate a query regarding a color-unknown region in the image while coloring the image and transmit the query to the user terminal 100. This will be described in detail below.

The server 200 may be implemented as one or more computing devices providing an instruction, a code, a file, content, and a service to the user terminal 100 via the network 300.

Figure 2:
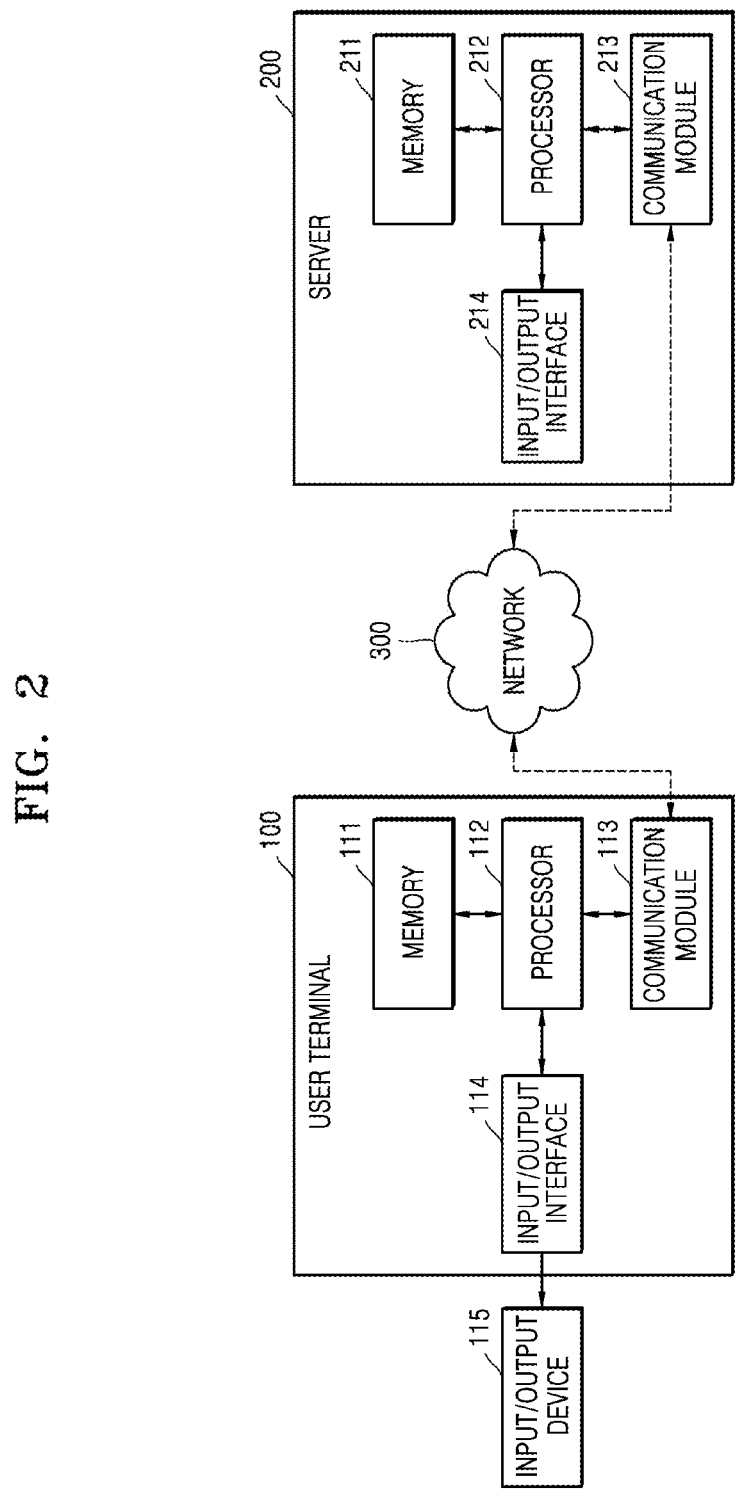
FIG. 2 is a block diagram for describing internal configurations of a user terminal and a server, according to an embodiment of the present disclosure.

FIG. 2 is a block diagram for describing internal configurations of the user terminal 100 and the server 200, according to an embodiment of the present disclosure.

The user terminal 100 and the server 200 may include memories 111 and 211, processors 112 and 212, communication modules 113 and 213, and input/output interfaces 114 and 214.

The memories 111 and 211 are computer-readable recording media, and may include random access memory (RAM), read-only memory (ROM), and a permanent mass storage device such as a disk drive.

Also, the memories 111 and 211 may store an operating system and at least one program code (for example, code for a program installed in the user terminal 100 and coloring an image via transmission/reception of data with the server 200).

Such software components may be loaded from a computer-readable recording medium separate from the memories 111 and 211, by using a drive mechanism. Such a separate computer-readable recording medium may include a computer-readable recording medium such as a floppy drive, a disk, a tape, a DVD/CD-ROM drive, or a memory card.

According to another embodiment, the software components may be loaded on the memories 111 and 211 through the communication modules 113 and 223, instead of the computer-readable recording medium. For example, at least one program may be loaded on the memories 111 and 211 based on a program installed by files provided by developers or a file distribution system (for example, the server 200) distributing an application installation file, through the network 300.

The processors 112 and 212 may be configured to process an instruction of a computer program by performing basic arithmetic, logic, and input/output operations. The instruction may be provided to the processors 112 and 212 by the memories 111 and 211 or the communication modules 113 and 213. For example, the processors 112 and 212 may be configured to execute a received instruction according to a program code stored in recording devices, such as the memories 111 and 211.

The communication modules 113 and 213 may provide a function enabling the user terminal 100 and the server 200 to communicate with each other through the network 300, and may provide a function for communicating with another user terminal (not shown) or another server (not shown). For example, a request generated by the processor 112 of the user terminal 100 according to a program code stored in a recording medium, such as the memory 111 may be transmitted to the server 200 through the network 300, according to a control of the communication module 113. On the other hand, a control signal, an instruction, content, or a file provided according to a control of the processor 212 of the server 200 may be transmitted to the user terminal 100 through the communication module 113 of the user terminal 100 via the communication module 213 and the network 300.

The input/output interfaces 114 and 214 may be a unit for an interface with an input/output device 115. Here, an input device may include a device such as a keyboard or a mouse, and an output device may include a device such as a display for displaying an image. As another example, the input/output interfaces 114 and 214 may be a unit for an interface with a device in which functions for input and output are integrated, such as a touch screen.

Also, according to other embodiments, the user terminal 100 and the server 200 may include more components than those shown in FIG. 2. However, there is no need to clearly illustrate most of components of the related art. For example, the user terminal 100 may be implemented to include at least some of the input/output device 115 described above or may further include other components, such as a transceiver, a global positioning system (GPS) module, a camera, various sensors, and a database.

The processor 212 of the server 200 according to an embodiment of the present disclosure may, by using an artificial neural network, determine a color fora color-unknown region in an image or generate a query regarding the color-unknown region.

In the present disclosure, the artificial neural network is a neural network trained to color an image in which coloring is not completed, and may be trained via machine learning or deep learning.

Figure 3:
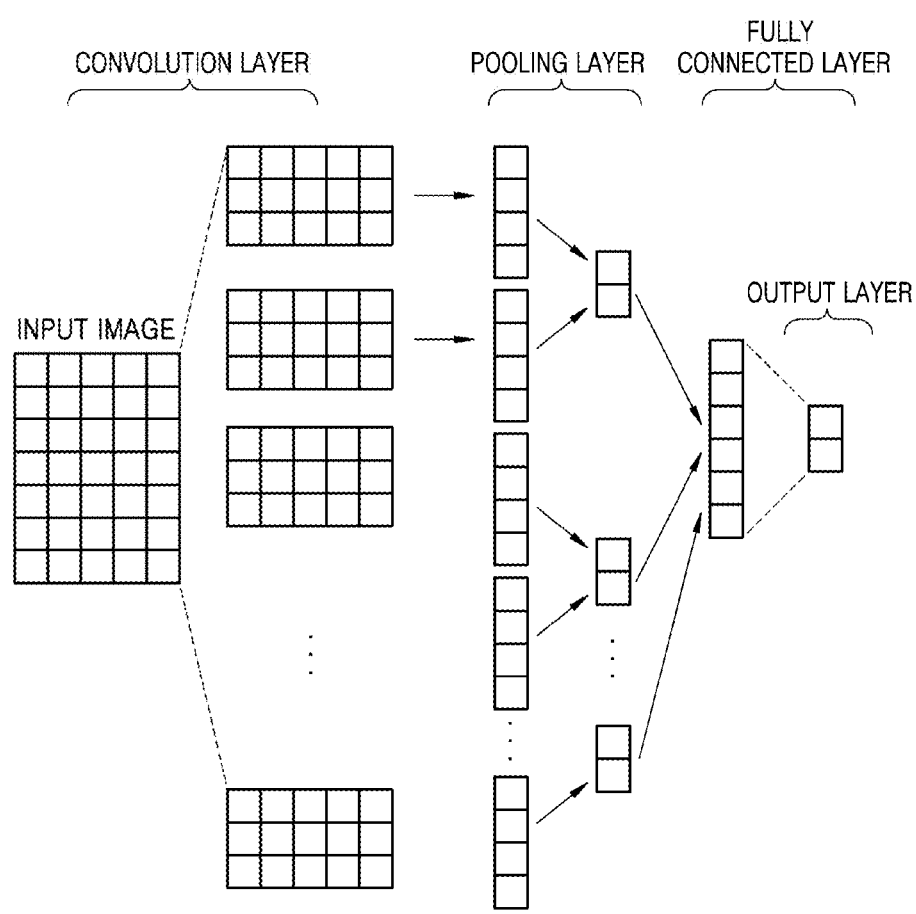
FIG. 3 is a diagram for describing a structure of an exemplary artificial neural network trained by a processor.

FIG. 3 is a diagram for describing a structure of an exemplary artificial neural network trained by the processor 212.

The artificial neural network according to an embodiment of the present disclosure may be a neural network according to a convolutional neural network (CNN) model. Here, the CNN model may be a layer model that alternately performs a plurality of operation layers (convolutional layers and pooling layers) to be finally used to extract features of input data.

The processor 212 according to an embodiment of the present disclosure may construct or train a neural network model by processing training data according to a supervised learning technique. Here, the training data may include an input image in which a first region is not colored, a third color query regarding a colored second region in the input image, an answer to the third color query, an output image in which the first region of the input image is colored, and a fourth color query that is a query about a color of a region of the output image, which is not colored. Accordingly, the processor 212 may train the artificial neural network based on training data including an image in which a region to be colored is not colored and an image in which the region is colored. Also, the artificial neural network trained based on the training data may be used to generate a first intermediate image and/or a second intermediate image described below.

Also, the processor 212 may train the artificial neural network based on training data including a query about a color used for coloring of an already-colored region in an image, an answer to the query, and a query about a color of another region in the image. The artificial neural network trained based on the training data may be used to generate the fourth color query about the output image described below.

FIG. 3 illustrates an exemplary structure of a neural network model constructed by the processor 212 using training data. The processor 212 may generate a convolution layer for extracting a feature value of each of the input image, the third color query about the colored second region of the input image, and the third answer to the third color query, which are included in the training data, and a pooling layer configuring a feature map by combining the extracted feature values.

Also, the processor 212 may generate a fully connected layer for estimating an unknown degree for each color-unknown region in the input image by combining the generated feature maps, determining a color of at least a partial region of the input image, and preparing to generate a query about another partial region in the input image.

Lastly, the processor 212 may calculate an output layer including the unknown degree of each unknown region in the input image, the color of the at least the partial region in the input image, and the query about the other partial region in the input image.

In the example of FIG. 3, the input image is divided into 5×7 blocks, a 5×3 unit block is used for generation of the convolution layer, and 1×4 or 1×2 unit block is used for generation of the pulling layer, but this is only an example and the scope of the present disclosure is not limited thereto. A size of an image block used for generation of each layer may be variously set.

Such an artificial neural network may be stored in the memory 211 in a form of a coefficient of at least one node configuring the artificial neural network, a weight of a node, and coefficients of a function defining a relationship between a plurality of layers configuring the artificial neural network. Obviously, a structure of the artificial neural network may also be stored in the memory 211 in a form of source code and/or program.

Referring in detail to a process by which the processor 212 trains the neural network by using the training data, the processor 212 may train the artificial neural network by using the input image in which the first region is not colored and the output image in which the first region is colored in a first color in the input image, such that a corresponding relationship between the first region and the first color is reflected (hereinafter, first training). Here, the input image and the output image may both be images included in the training data as one training set. The first region may indicate any region in the input image, which is not colored.

In other words, the processor 212 may train the artificial neural network by using an image in which coloring is completed and an image in which coloring is not completed such that a certain shape feature and a certain color correspond to each other.

Meanwhile, in the present disclosure, the "training" of the artificial neural network may indicate that the coefficient of the at least one node configuring the artificial neural network, the weight of the node, and/or the coefficients of the function defining the relationship between the plurality of layers configuring the artificial neural network are updated.

The processor 212 may train the artificial neural network such that a corresponding relationship between the input image, the third color query regarding the colored second region of the input image, the third answer to the third color query, the output image in which the first region is colored in the first color in the input image, and the fourth color query regarding the output image is further reflected (hereinafter, referred to as second training). Here, the input image, the third color query, the output image, and the fourth color query may all be included in the training data as one training set. Meanwhile, the processor 212 may determine the third answer based on an average color of the second region of the input image.

In other words, the processor 212 may train the artificial neural network such that and an answer thereto to color a colored region of an image of which at least a part is less colored is matched to a query used a query about a color-unknown region of an image of which at least a part is more colored The first training and the second training are merely for distinguishing an order for convenience of description, and thus the processor 212 may perform the second training before the first training or simultaneously perform the first training and the second training.

Hereinafter, a method by which the processor 212 completes coloring of an image will be described based on a premise that the artificial neural network described above has been trained by the processor 212.

The processor 212 according to an embodiment of the present disclosure may obtain an image to be colored. For example, the processor 212 may receive a primary image to be colored from the user terminal 100 or read the primary image to be colored from the memory 211 in the server 200.

In the present disclosure, an "image to be colored", a "primary image", or an "input image" may indicate an image that has at least a partial uncolored region and thus requires coloring in the uncolored region. For example, an image to be colored may be an image that includes only an outline (or a sketch) and does not include any colored region.

Figure 4:
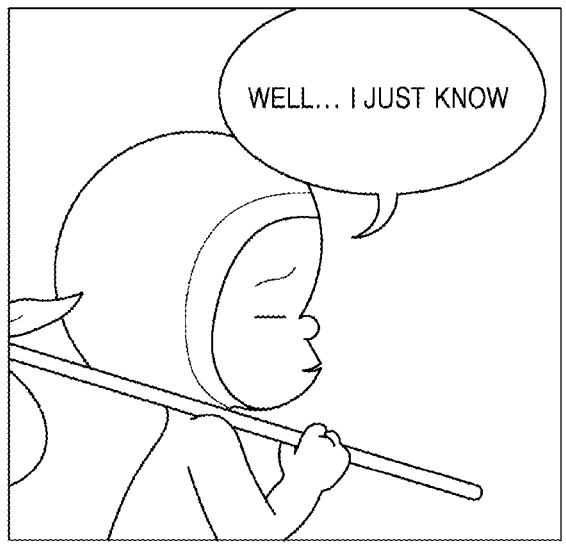
FIG. 4 is a diagram of an example of a primary image.

FIG. 4 is a diagram of an example of a primary image.

As described above, the primary image may indicate an image that has at least a partial uncolored region and thus requires coloring in the uncolored region. The primary image may be a scene of a cartoon as shown in FIG. 4, or may be any type of images, such as a poster or an illustration. Hereinafter, for convenience of description, an image shown in FIG. 4 will be described as an example of the primary image.

The processor 212 according to an embodiment of the present disclosure may generate a first intermediate image in which at least one uncolored region in the primary image is colored by using the artificial neural network described above.

As described above, the artificial neural network may be trained by using an image in which coloring is completed and an image in which coloring is not completed such that a certain shape feature and a certain color correspond to each other. Accordingly, the processor 212 may color at least a partial region of the primary image by using the artificial neural network.

Figure 5:
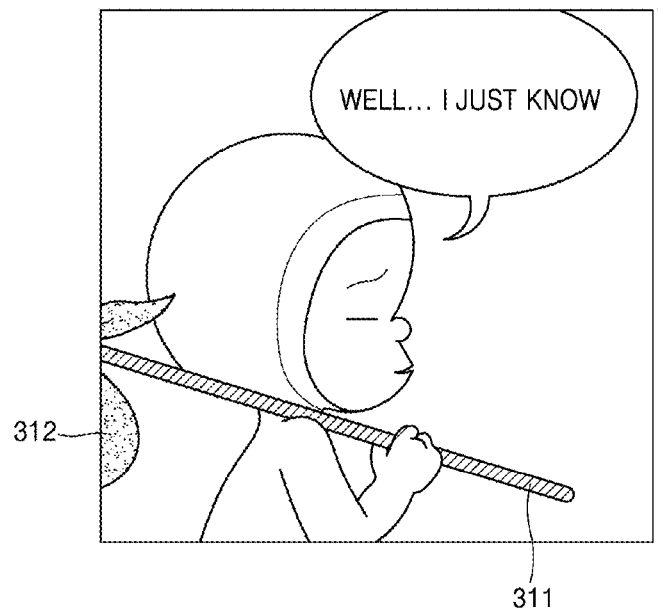
FIG. 5 is a diagram of an example of a first intermediate image generated by the processor from the primary image of FIG. 4.

FIG. 5 is a diagram of an example of the first intermediate image generated by the processor 212 from the primary image of FIG. 4.

The processor 212 may generate the first intermediate image in which partial regions 311 and 312 of the primary image of the FIG. 4 are colored, as shown in FIG. 5.

The processor 212 according to an embodiment of the present disclosure may divide the primary image into a plurality of regions and calculate a probability of each region being colored by each of a plurality of colors. For example, the processor 212 may detect a component of an outline from the primary image, divide the primary image into the plurality of regions based on the outline, and calculate the probability of each region being colored by each of the plurality of colors.

The processor 212 may use the artificial neural network to calculate the probability of each region being colored by each of the plurality of colors. For example, the processor 212 may calculate a probability of the region 312 being colored in blue to be 95%, in red to be 13%, and in green to be 32%.

When a probability of a certain region being colored in a certain color is equal to or greater than a certain threshold probability, the processor 212 may determine that the certain region is colored in the certain color. For example, when the threshold probability is 90% and the probability of the region 312 being colored in blue is 95%, the processor 212 may determine to color the region 312 in blue.

However, above types of colors and the threshold probability are only examples and the scope of the present disclosure is not limited thereto.

According to a selective embodiment, the processor 212 may calculate a color unknown degree for each region based on the probability of each region being colored in each of the plurality of colors. For example, the processor 212 may calculate the color unknown degree of the region to correspond to a probability of a color having a highest coloring probability. Obviously, the processor 212 may calculate the color unknown degree of the region to correspond to an average value of coloring probabilities of all or some colors. The calculated color unknown degree may be used to generate the first intermediate image described above or to generate a first color query described below.

The processor 212 may generate, by using the artificial neural network, the first color query regarding the at least one color-unknown region in the primary image. For example, the processor 212 may generate a query by selecting one of the plurality of regions in the primary image.

Figure 6:
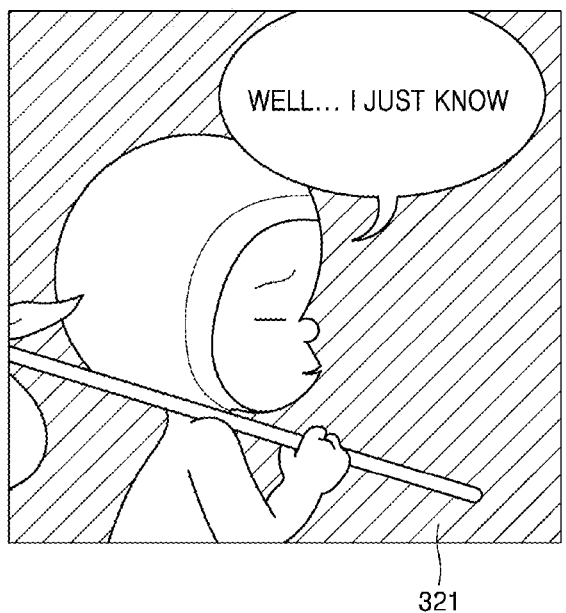
FIG. 6 is a diagram of an example of a first color query generated by the processor from the primary image of FIG. 4, according to an embodiment of the present disclosure.

FIG. 6 is a diagram of an example of the first color query generated by the processor 212 from the primary image of FIG. 4, according to an embodiment of the present disclosure.

For example, when the processor 212 determined that a region 321 is a color-unknown region, the processor 212 may generate a query image as shown in FIG. 6.

The query image generated by the processor 212 may be transmitted to the user terminal 100 described above and used to request a user for an answer.

The user terminal 100 may refer to the query image and input an answer about a color of the region 321, i.e., a first answer, to the user terminal 100. For example, the user may input, to the user terminal 100, the first answer by selecting one of a plurality of colors. The first answer input to the user terminal 100 may be transmitted to the server 200 and used to generate a secondary image described below.

Figure 7:
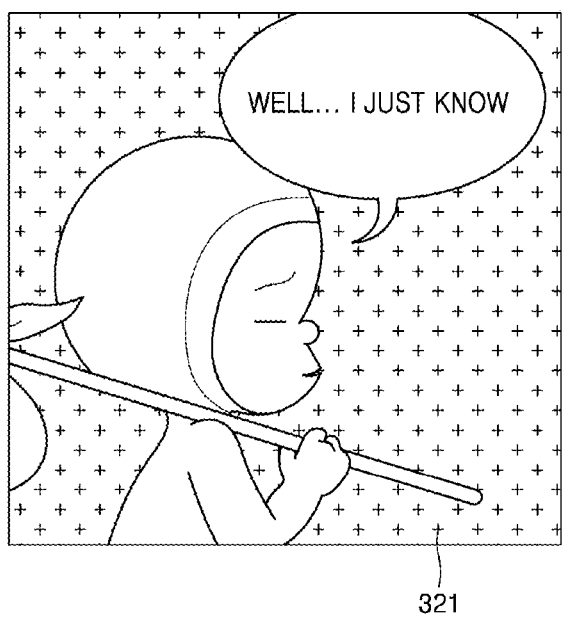
FIG. 7 is a diagram of an example of a first answer input to the user terminal by a user.

FIG. 7 is a diagram of an example of the first answer input to the user terminal 100 by the user.

For example, when the processor 212 generated the query image shown in FIG. 6 and transmitted the query image to the user terminal 100, the user may select a color of the region 321 corresponding to the query, as shown in FIG. 7. The color selected by the user, i.e., the first answer, may be transmitted to the server 200 and used to generated the secondary image as described above.

Meanwhile, the processor 212 according to an embodiment of the present disclosure may calculate the color unknown degree for each region, based on the probability of each region in the primary image being colored in each of the plurality of colors, as described above. The processor 212 may select a color-unknown region in which the calculated unknown degree satisfies a certain condition, from among at least one color-unknown region in the primary image, and generate a query about a color of the selected color-unknown region as the first color query. For example, the processor 212 may select a region having a highest color unknown degree, and generate, as the first color query, a query about a color of the region.

The processor 212 according to an embodiment of the present disclosure may generate the secondary image based on at least one of the first color query, the first answer to the first color query received from the user terminal 100, and the first intermediate image, which are generated via the above processes.

For example, the processor 212 may generate each of a layer including the primary image, a layer including information about a region to be colored by the first answer in response to the first color query, a layer including coloring information of the region colored according to the first answer, and a layer including the first intermediate image. Then, the processor 212 may generate the secondary image by combining the generated layers.

Here, the processor 212 may combine the layers by reflecting weights between the layers or by reflecting priorities of the layers. The weights or priorities may be determined by the artificial neural network.

Figure 8:
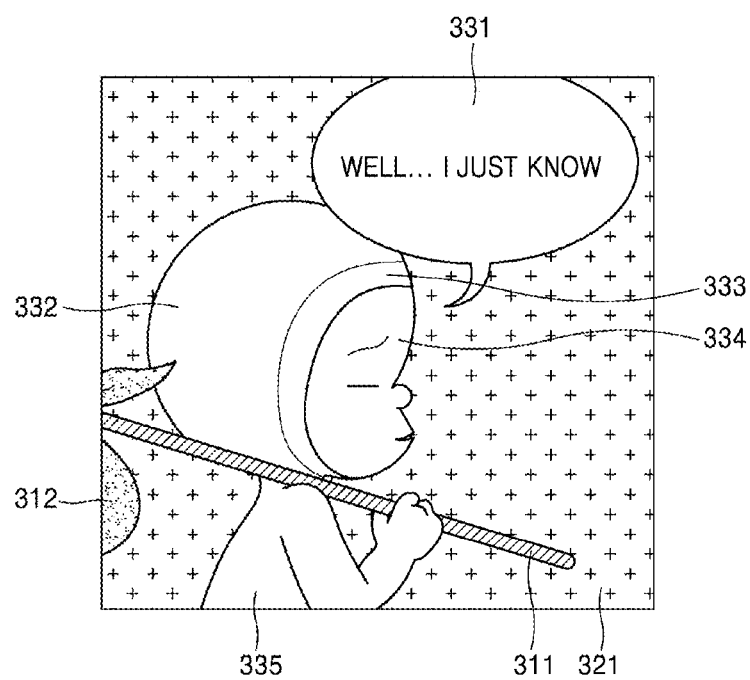
FIG. 8 is a diagram of an example of a secondary image.

FIG. 8 is a diagram of an example of the secondary image.

As shown in FIG. 8, the regions 311, 312, and 321 in the secondary image may have been colored according to the processes described in FIGS. 5 through 7, while remaining regions 331, 332, 333, 334, and 335 are not yet colored.

Figure 9:
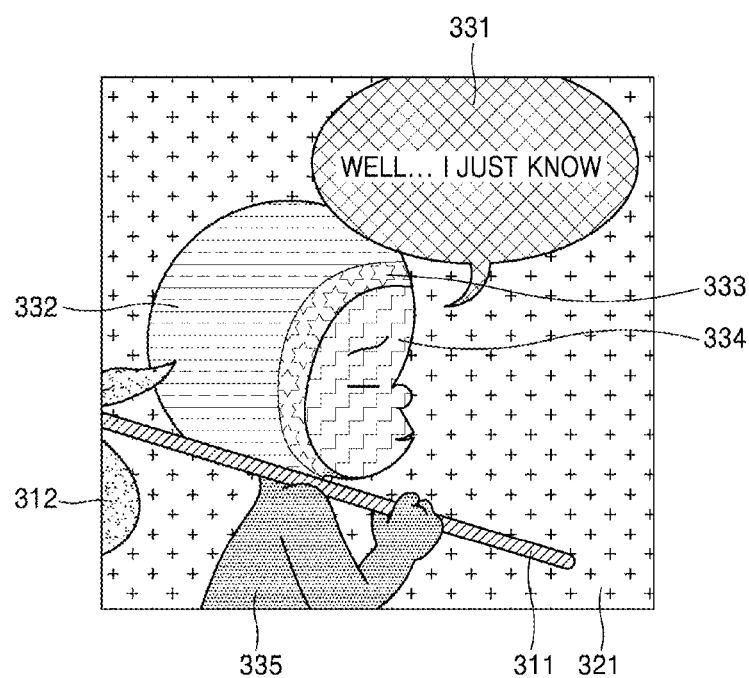
FIG. 9 is a diagram of an example of a completed image in which coloring of all regions is completed.

The processor 212 according to an embodiment of the present disclosure may generate a completed image in which all regions 311 through 335 are colored as shown in FIG. 9, by repeatedly performing the method described in FIGS. 4 through 8 on the secondary image of FIG. 8.

Figure 10:
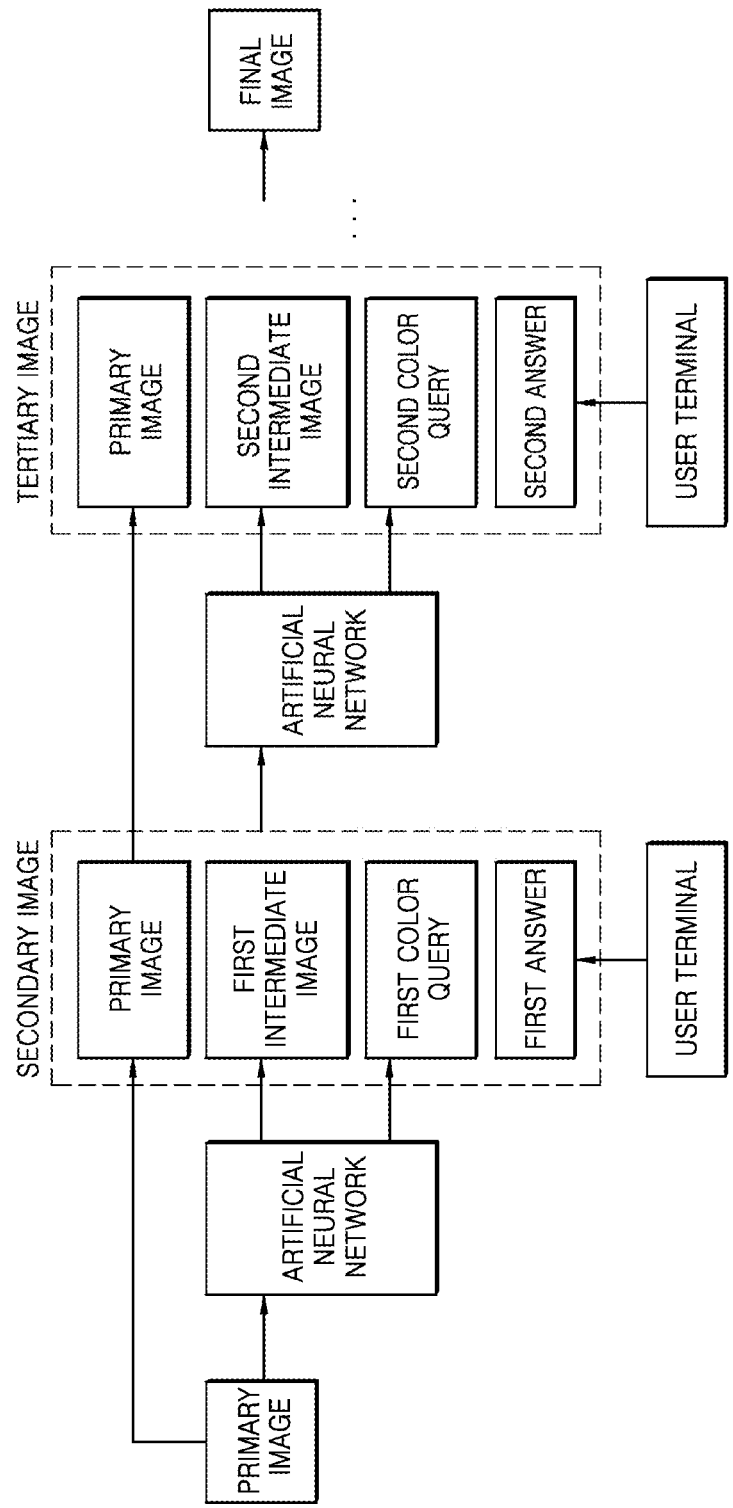
FIG. 10 is a diagram for describing a process by which the processor generates a completed image.

Hereinafter, the process by which the processor 212 generates the completed image will be described again with reference to FIG. 10.

Process of Generating Secondary Image from Primary Image

The processor 212 according to an embodiment of the present disclosure may generate the first intermediate image in which at least one uncolored region in the primary image is colored by using the artificial neural network. (see FIG. 5)

Also, the processor 212 may generate, by using the artificial neural network, the first color query regarding the at least one color-unknown region in the primary image. (see FIG. 6)

The query (or query image) generated by the processor 212 may be transmitted to the user terminal 100 described above and used to request the user for an answer. The first answer input to the user terminal 100 may be transmitted to the server 200 and used to generate the secondary image. (see FIG. 7)

The processor 212 according to an embodiment of the present disclosure may generate the secondary image based on at least one of the first color query, the first answer to the first color query received from the user terminal 100, and the first intermediate image, which are generated via the above processes.

For example, the processor 212 may generate each of the layer including the primary image, the layer including the information about the region to be colored by the first answer in response to the first color query, the layer including the coloring information of the region colored according to the first answer, and the layer including the first intermediate image. Then, the processor 212 may generate the secondary image by combining the generated layers. (see FIG. 8)

Here, the processor 212 may combine the layers by reflecting the weights between the layers or by reflecting the priorities of the layers. The weights or priorities may be determined by the artificial neural network.

Process of Generating Tertiary Image from Secondary Image

The processor 212 according to an embodiment of the present disclosure may generate a second intermediate image in which at least one uncolored region in the secondary image is colored by using the artificial neural network. For example, the processor 212 may generate the second intermediate image in which the region 331 that is an uncolored region in the secondary image of FIG. 8 is further colored.

The processor 212 may generate, by using the artificial neural network, a second color query regarding the at least one color-unknown region in the secondary image. For example, the processor 212 may generate the second color query about the region 334 that is an uncolored region in the secondary image of FIG. 8.

A query (or query image) generated by the processor 212 may be transmitted to the user terminal 100 described above and used to request the user for an answer. A second answer input to the user terminal 100 may be transmitted to the server 200 and used to generate the tertiary image.

The processor 212 according to an embodiment of the present disclosure may generate the tertiary image based on at least one of the primary image, the second color query, the second answer to the second color query received from the user terminal 100, and the second intermediate image, which are generated via the above processes.

For example, the processor 212 may generate each of the layer including the primary image, a layer including information about a region to be colored by the second answer in response to the second color query, a layer including coloring information of the region colored according to the second answer, and a layer including the second intermediate image. Then, the processor 212 may generate the tertiary image by combining the generated layers.

Here, the processor 212 may combine the layers by reflecting weights between the layers or by reflecting priorities of the layers. The weights or priorities may be determined by the artificial neural network.

Process of Generating Completed Image

The processor 212 according to an embodiment of the present disclosure may generate the completed image in which all regions are colored by repeatedly performing the above-described processes on the generated tertiary image. For example, the processor 212 may generate the secondary image at a second time point to be the same as the tertiary image at a first time point before the second time point. In other words, the processor 212 may consider the tertiary image of a previous time point as the secondary image of a current time point.

Then, the processor 212 may generate the completed image in which the all regions 311 through 335 are colored as shown in FIG. 9, by repeatedly performing, on the secondary image, the process of generating the second intermediate image, the process of generating the second color query, and the process of generating the tertiary image.

The processor 212 according to an embodiment of the present disclosure may set the number of repetitions to be less than a certain threshold number. For example, the processor 212 may set the number of repetitions to 5.

Satisfaction of a condition of a set threshold number of repetitions may be achieved by the processor 212 suitably adjusting a threshold probability of determining whether to automatically color a certain region based on an output of the artificial neural network and/or a certain condition of determining whether to perform a color query on a color-unknown region.

Figure 11:
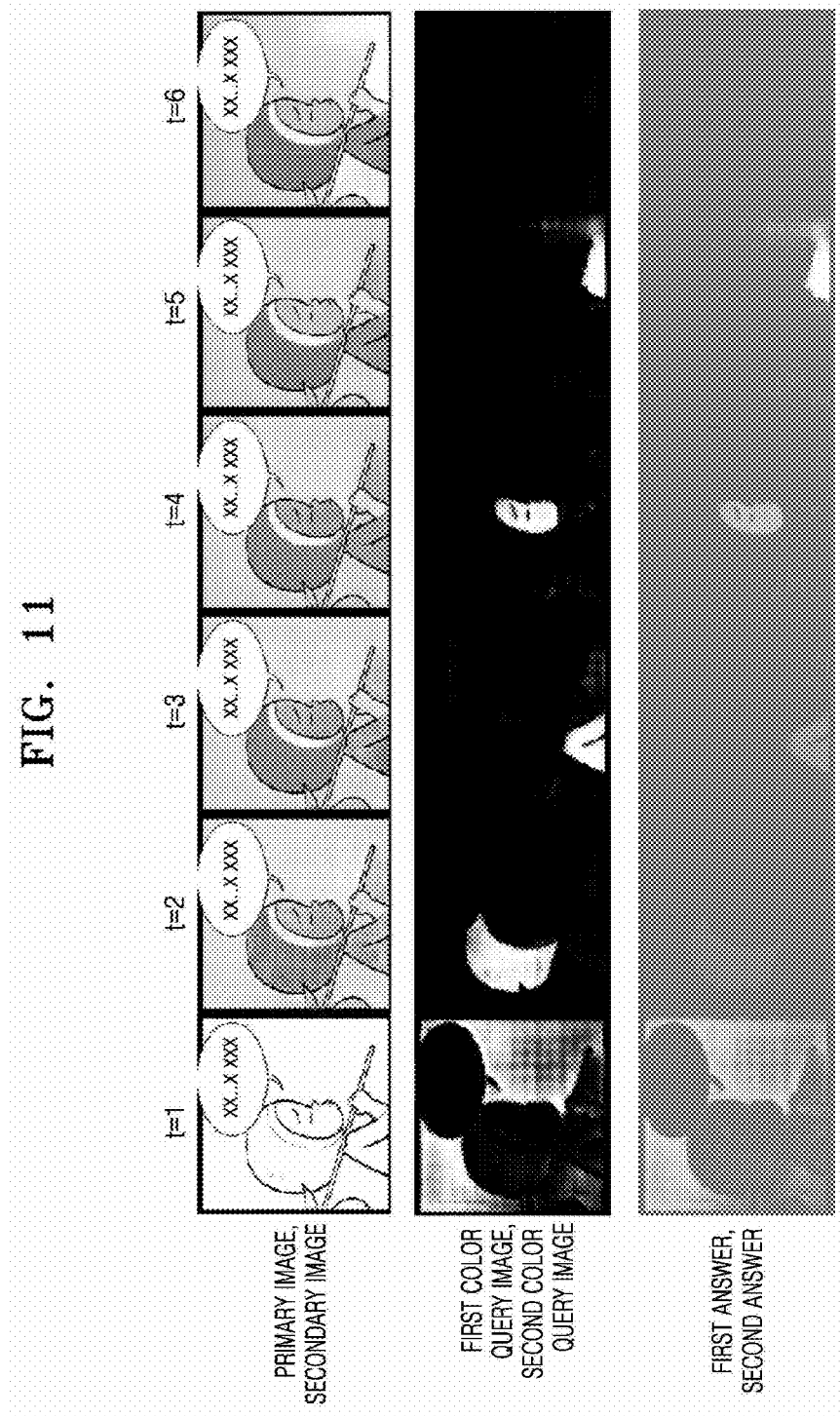
FIG. 11 is a diagram showing images and answers generated during a series of processes by which the processor generates a completed image from an input image, according to an embodiment of the present disclosure.

FIG. 11 is a diagram showing images and answers generated during a series of processes by which the processor 212 generates the completed image from the input image, according to an embodiment of the present disclosure.

For convenience of description, it is assumed that the input image (or the primary image) is input at a time point when t=1, and a time point increases in units of 1.

In this case, the processor 212 according to an embodiment of the present disclosure may generate an image of the first color query on the primary image and obtain the first answer thereto at the time point when t=1. The processor 212 may generate the secondary image based on at least one of the primary image, the first color query, the first answer to the first color query, and the first intermediate image.

At a time point when t=2, the processor 212 according to an embodiment of the present disclosure may generate an image of the second color query for the generated secondary image and obtain the second answer thereto. The processor 212 may generate the tertiary image based on at least one of the primary image, the second color query, the second answer to the second color query, and the second intermediate image.

At a time point when t=3, the processor 212 according to an embodiment of the present disclosure may generate, by using the tertiary image at the time point when t=2 as the secondary image, the image of the second color query for the secondary image and obtain the second answer thereto. The processor 212 may generate the new tertiary image based on at least one of the primary image, the second color query, the second answer to the second color query, and the second intermediate image.

The processor 212 may generate the completed image in which the all regions 311 through 335 are colored as shown in FIG. 9, by repeatedly performing, on the secondary image, the process of generating the second intermediate image, the process of generating the second color query, and the process of generating the tertiary image.

The processor 212 may stop the repetition when there is no more second color query. For example, when a query does not include any content as in a query image at a time point when t=6, the processor 212 may stop the repetition upon determining that coloring of an image is completed.

As such, the present disclosure may reduce efforts of the user in coloring an image.

Figure 12:
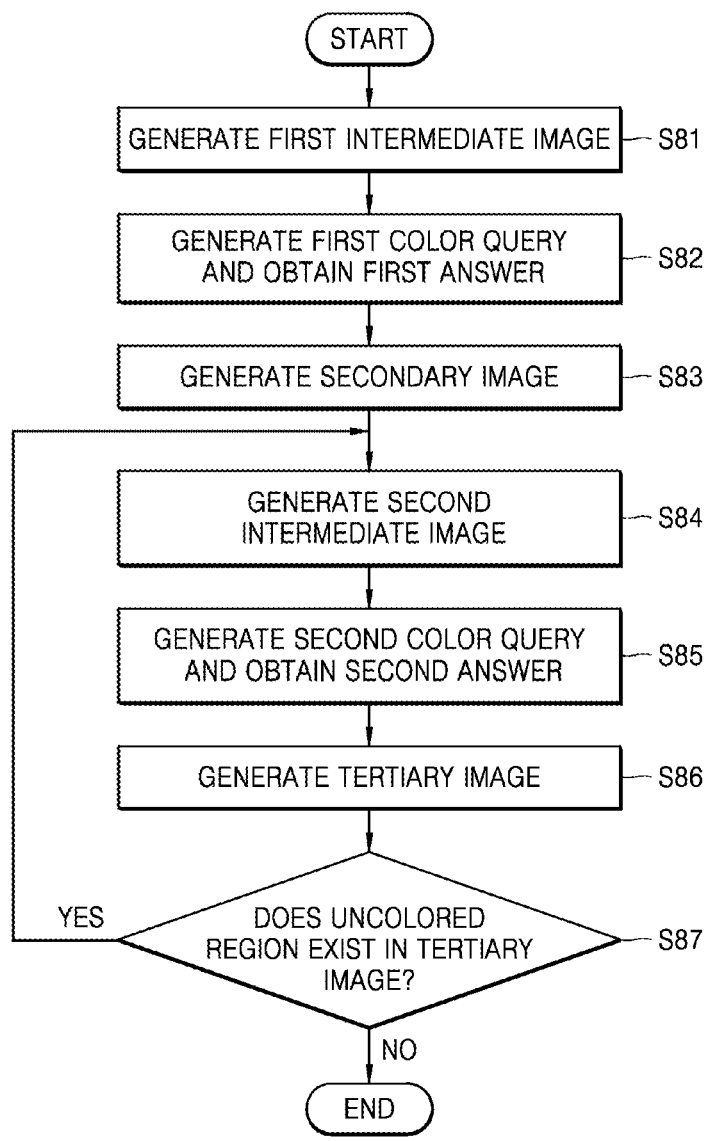
FIG. 12 is a flowchart of a method, performed by the server, of completing coloring of an image, according to an embodiment of the present disclosure.

FIG. 12 is a flowchart of a method, performed by the server 200, of completing coloring of an image, according to an embodiment of the present disclosure. Hereinafter, the method will be described also with reference to FIGS. 1 through 11, and descriptions overlapping those of FIGS. 1 through 11 are omitted.

The server 200 according to an embodiment of the present disclosure may generate the first intermediate image in which at least one uncolored region in the primary image is colored by using the artificial neural network (see FIG. 5), in operation S81.

Also, the server 200 may generate the first color query regarding the at least one color-unknown region in the primary image by using the artificial neural network (see FIG. 6), and obtain the first answer to the first color query (see FIG. 7), in operation S82. In detail, a query (or query image) generated by the server 200 may be transmitted to the user terminal 100 and request the user for an answer. The first answer input to the user terminal 100 may be transmitted to the server 200 and used to generate the secondary image described below.

The server 200 according to an embodiment of the present disclosure may generate the secondary image based on at least one of the first color query, the first answer to the first color query received from the user terminal 100, and the first intermediate image, which are generated via the above processes (see FIG. 8), in operation S83.

For example, the server 200 may generate each of the layer including the primary image, the layer including the information about the region to be colored by the first answer in response to the first color query, the layer including the coloring information of the region colored according to the first answer, and the layer including the first intermediate image. Then, the server 200 may generate the secondary image by combining the generated layers.

Here, the server 200 may combine the layers by reflecting the weights between the layers or by reflecting the priorities of the layers. The weights or priorities may be determined by the artificial neural network.

The server 200 according to an embodiment of the present disclosure may generate the second intermediate image in which at least one uncolored region in the secondary image is colored by using the artificial neural network, in operation S84. For example, the server 200 may generate the second intermediate image in which the region 331 that is an uncolored region in the secondary image of FIG. 8 is further colored.

The server 200 may generate, by using the artificial neural network, the second color query regarding the at least one color-unknown region in the secondary image, and obtain the second answer to the second color query, in operation S85. For example, the server 200 may generate the second color query about the region 334 that is an uncolored region in the secondary image of FIG. 8.

As in operation S82, a query (or query image) generated by the server 200 may be transmitted to the user terminal 100 described above and used to request the user for an answer. The second answer input to the user terminal 100 may be transmitted to the server 200.

The server 200 according to an embodiment of the present disclosure may generate the tertiary image based on at least one of the primary image, the second color query, the second answer to the second color query received from the user terminal 100, and the second intermediate image, which are generated via the above processes, in operation S86.

For example, the server 200 may generate each of the layer including the primary image, the layer including the information about the region to be colored by the second answer in response to the second color query, the layer including the coloring information of the region colored according to the second answer, and the layer including the second intermediate image. Then, the server 200 may generate the tertiary image by combining the generated layers.

Here, the server 200 may combine the layers by reflecting the weights between the layers or by reflecting the priorities of the layers. The weights or priorities may be determined by the artificial neural network.

The server 200 according to an embodiment of the present disclosure may identify whether an uncolored region exists in the tertiary image, in operation S87. Such identification may be performed by identifying whether a query regarding the tertiary image includes content. For example, when the query regarding the tertiary image does not include any content, it may be determined that an uncolored region does not exist in the tertiary image. The server 200 may end the coloring when an uncolored region does not exist in the tertiary image.

When an uncolored region exists in the tertiary image, the server 200 may complete the coloring by repeatedly performing operations S84 to S87 on the tertiary image. For example, the server 200 may generate the secondary image at the second time point to be the same as the tertiary image at the first time point before the second time point. In other words, the server 200 may repeatedly perform operations S84 to S87 considering that the tertiary image at the previous time point is the secondary image at the current time point.

The server 200 according to an embodiment of the present disclosure may set the number of repetitions to be less than the certain threshold number. For example, the server 200 may set the number of repetitions to 5.

Satisfaction of a condition of a set threshold number of repetitions may be achieved by the server 200 suitably adjusting a threshold probability of determining whether to automatically color a certain region based on an output of the artificial neural network and/or a certain condition of determining whether to perform a color query on a color-unknown region.

Figure 13:
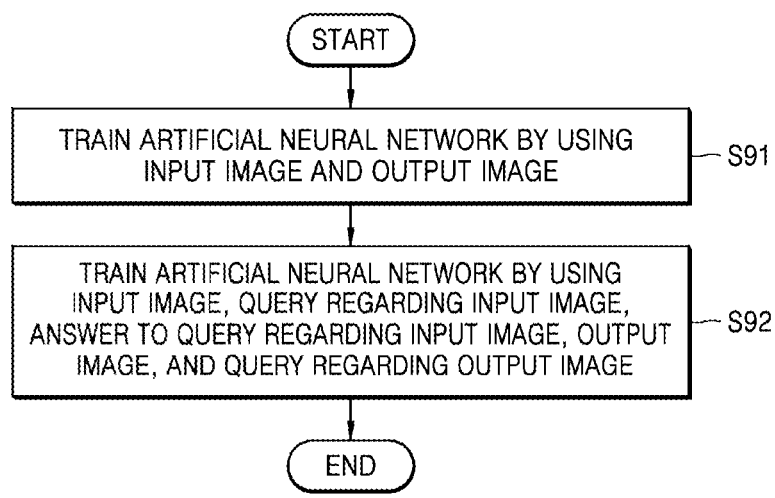
FIG. 13 is a flowchart of a method, performed by the server, of training an artificial neural network, according to an embodiment of the present disclosure.

FIG. 13 is a flowchart of a method, performed by the server 200, of training the artificial neural network, according to an embodiment of the present disclosure.

The server 200 according to an embodiment of the present disclosure may train the artificial neural network by using an input image in which a first region is not colored and an output image in which the first region is colored in a first color in the input image such that a corresponding relationship between the first region and the first color is reflected (first training), in operation S91. Here, the input image and the output image may both be images included in the training data as one training set. The first region may indicate any region in the input image, which is not colored. In other words, the server 200 may train the artificial neural network by using an image in which coloring is completed and an image in which coloring is not completed such that a certain shape feature and a certain color correspond to each other.

Then, the server 200 may train the artificial neural network such that a corresponding relationship between the input image, a third color query regarding a colored second region of the input image, a third answer to the third color query, the output image in which the first region is colored in the first color in the input image, and a fourth color query regarding the output image is further reflected (second training), in operation S92. Here, the input image, the third color query, the output image, and the fourth color query may all be included in the training data as one training set. Meanwhile, the server 200 may determine the third answer based on an average color of the second region of the input image.

In other words, the server 200 may train the artificial neural network such that a query about a color-unknown region of an image of which at least a part is more colored and a query used to color a colored region of an image of which at least a part is less colored are matched to answers thereto.

According to another embodiment of the present disclosure, the method of completing an image and/or a method of training an artificial neural network may be performed by the user terminal 100 and/or the processor 112 of the user terminal 100.

In this case, a user input may be obtained via the input/output device 115 or the input/output interface 114 of the user terminal 100. For example, the user may input, via the input/output device 115, an answer to a color of the region 321, i.e., the first answer, by referring to a query image displayed on an output device (not shown) of the user terminal 100, and the input answer may be used by the processor 112 to generate the secondary image.

The device described above may be realized by a hardware component, a software component, and/or a combination of a hardware component and a software component. For example, the device and component described in embodiments may be realized by using one or more general-purpose computers or special purpose computers, such as a processor, a controller, an arithmetic logic unit (ALU), a digital signal processor, a micro-computer, a field programmable gate array (FPGA), a programmable logic unit (PLU), a micro-processor, or any other device capable of executing and responding to an instruction. A processing device may execute an operating system (OS) and one or more software applications executed on the OS. Also, the processing device may access, store, manipulate, process, and generate data in response to execution of software. For convenience of description, it has been described that one processing device is used, but it would be obvious to one of ordinary skill in the art that the processing device may include a plurality of processing elements and/or a plurality of types of processing elements. For example, the processing device may include a plurality of processors or one processor and one controller. Also, another processing configuration, such as a parallel processor, is possible.

The software may include a computer program, a code, an instruction, or a combination thereof, and may configure the processing device to operate as desired or instruct the processing device independently or collectively. The software and/or data may be embodied, permanently or temporarily, by any type of machine, component, physical device, virtual equipment, computer storage medium or device, or transmitted signal wave, such as to be analyzed by the processing device or provided to the processing device. The software may be distributed on a computer system connected to a network, and stored or executed in a distributed manner. The software and data may be stored in one or more computer-readable recording media.

Methods according to embodiments may be recorded on a computer-readable recording medium by being implemented in a form of program commands executed by using various computers. The computer-readable recording medium may include at least one of a program command, a data file, and a data structure, independently or collectively. The program commands recorded in the computer-readable recording medium may be specially designed for an embodiment or well known to one of ordinary skill in the computer software field. Examples of the computer-readable recording medium include magnetic media such as hard disks, floppy disks, and magnetic tapes, optical media such as CD-ROMs and DVDs, magneto-optical media such as floptical disks, and hardware devices specially configured to store and perform program commands, such as read-only memory (ROM), random-access memory (RAM), and flash memory. Examples of the computer command include mechanical codes prepared by a compiler, and high-level language codes executable by a computer by using an interpreter. The hardware device may be configured to operate as one or more software modules to perform operations of an embodiment, or vice versa.

As described above, embodiments have been described by the limited embodiments and drawings, but various modifications and modifications are possible from the above description by one of ordinary skill in the art. For example, appropriate results may be achieved even when the described techniques are performed in an order different from the described method, and/or components, such as a system, a structure, a device, and a circuit, are combined or associated in a form different from the described method, or replaced by other components or equivalents.

Therefore, other implementations, other embodiments, and equivalents of claims are also within the scope of the claims described below.

We claim:

1. A method of completing coloring of an image based on a query regarding a color-unknown region in the image and an answer to the query, the method comprising:
generating, by using an artificial neural network, a first intermediate image in which at least one uncolored region in a primary image is colored;
generating, by using the artificial neural network, a first color query regarding the at least one color-unknown region in the primary image; and
generating a secondary image based on at least one of the first color query, a first answer to the first color query, and the first intermediate image,
wherein the artificial neural network is a neural network that further learned a corresponding relationship between an input image in which a first region is not colored, a third color query regarding a colored second region of the input image, a third answer to the third color query, an output image in which the first region is colored, and a fourth color query regarding the output image, and
wherein the second region is a region colored according to the third color query of the input image and the third answer.

2. The method of claim 1, further comprising, after the generating of the secondary image:
generating, by using the artificial neural network, a second intermediate image in which at least one uncolored region in the secondary image is colored;
generating, by using the artificial neural network, a second color query regarding the at least one color-unknown region in the secondary image; and
generating a tertiary image based on at least one of the primary image, the second color query, a second answer to the second color query, and the second intermediate image.

3. The method of claim 2, wherein
the first answer is determined based on a user input corresponding to the first color query, and
the second answer is determined based on a user input corresponding to the second color query.

4. The method of claim 2, wherein
the artificial neural network generates an unknown degree for each of the at least one color-unknown region in the secondary image, and
the generating of the second color query comprises generating, as the second color query, a query about a color of an unknown region in which the unknown degree satisfies a certain condition, from among the at least one color-unknown region in the secondary image.

5. The method of claim 2, further comprising generating a completed image in which all regions are colored by identically generating the secondary image at a second time point and the tertiary image at a first time point before the second time point and repeatedly performing the generating of the second intermediate image, the generating of the second color query, and the generating of the tertiary image.

6. A non-transitory computer-readable recording medium storing a computer program that, when executed by a computer, causes the computer to perform a method comprising:
generating, by using an artificial neural network, a first intermediate image in which at least one uncolored region in a primary image is colored;
generating, by using the artificial neural network, a first color query regarding the at least one color-unknown region in the primary image; and
generating a secondary image based on at least one of the first color query, a first answer to the first color query, and the first intermediate image,
wherein the artificial neural network is a neural network that further learned a corresponding relationship between an input image in which a first region is not colored, a third color query regarding a colored second region of the input image, a third answer to the third color query, an output image in which the first region is colored, and a fourth color query regarding the output image, and
wherein the second region is a region colored according to the third color query of the input image and the third answer.

7. An apparatus for completing coloring of an image based on a query regarding a color-unknown region in the image and an answer to the query, the apparatus comprising a processor configured to:
generate, by using an artificial neural network, a first intermediate image in which at least one uncolored region in a primary image is colored;
generate, by using the artificial neural network, a first color query regarding the at least one color-unknown region in the primary image; and
generate a secondary image based on at least one of the first color query, a first answer to the first color query, and the first intermediate image,
wherein the artificial neural network is a neural network that further learned a corresponding relationship between an input image in which a first region is not colored, a third color query regarding a colored second region of the input image, a third answer to the third color query, an output image in which the first region is colored, and a fourth color query regarding the output image, and
wherein the second region is a region colored according to the third color query of the input image and the third answer.

8. The apparatus of claim 7, wherein the processor is further configured to:
generate, by using the artificial neural network, a second intermediate image in which at least one uncolored region in the secondary image is colored;
generate, by using the artificial neural network, a second color query regarding the at least one color-unknown region in the secondary image; and
generate a tertiary image based on at least one of the primary image, the second color query, a second answer to the second color query, and the second intermediate image.

9. The apparatus of claim 8, wherein
the first answer is determined based on a user input corresponding to the first color query, and
the second answer is determined based on a user input corresponding to the second color query.

10. The apparatus of claim 8, wherein
the artificial neural network generates an unknown degree for each of the at least one color-unknown region in the secondary image, and
the processor is further configured to generate, as the second color query, a query about a color of an unknown region in which the unknown degree satisfies a certain condition, from among the at least one color-unknown region in the secondary image.

11. The apparatus of claim 8, wherein the processor is further configured to generate a completed image in which all regions are colored by identically generating the secondary image at a second time point and the tertiary image at a first time point before the second time point and repeatedly performing the generating of the second intermediate image, the generating of the second color query, and the generating of the tertiary image.

* * * * *